(12) United States Patent
Kondapalli et al.

(10) Patent No.: US 11,709,603 B2
(45) Date of Patent: Jul. 25, 2023

(54) MULTI-TIER WRITE ALLOCATION

(71) Applicant: NetApp Inc., San Jose, CA (US)

(72) Inventors: Ganga Bhavani Kondapalli, Sunnyvale, CA (US); Kevin Daniel Varghese, Santa Clara, CA (US); Ananthan Subramanian, San Ramon, CA (US); Cheryl Marie Thompson, Sunnyvale, CA (US); Anil Paul Thoppil, Sunnyvale, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 17/833,046

(22) Filed: Jun. 6, 2022

(65) Prior Publication Data

US 2022/0300178 A1 Sep. 22, 2022

Related U.S. Application Data

(63) Continuation of application No. 16/679,914, filed on Nov. 11, 2019, now Pat. No. 11,354,049, which is a continuation of application No. 15/581,369, filed on Apr. 28, 2017, now Pat. No. 10,489,073.

(51) Int. Cl.
*G06F 3/06* (2006.01)

(52) U.S. Cl.
CPC .......... *G06F 3/0631* (2013.01); *G06F 3/061* (2013.01); *G06F 3/067* (2013.01); *G06F 3/0665* (2013.01)

(58) Field of Classification Search
CPC ...... G06F 3/0631; G06F 3/061; G06F 3/0665; G06F 3/067

USPC .......................................... 711/170
See application file for complete search history.

(56) References Cited

U.S. PATENT DOCUMENTS

| | | | |
|---|---|---|---|
| 8,819,371 B2 | 8/2014 | Yoshihara et al. | |
| 8,838,931 B1 | 9/2014 | Marshak et al. | |
| 8,935,493 B1 | 1/2015 | Dolan et al. | |
| 2004/0230621 A1 | 11/2004 | Croisettier et al. | |
| 2007/0038754 A1 | 2/2007 | Nunez et al. | |
| 2007/0288515 A1 | 12/2007 | Sarma et al. | |
| 2011/0072225 A1* | 3/2011 | Kawaguchi | G06F 3/0685 711/170 |
| 2011/0252274 A1 | 10/2011 | Kawaguchi et al. | |
| 2011/0320754 A1 | 12/2011 | Ichikawa et al. | |
| 2012/0239860 A1 | 9/2012 | Atkisson et al. | |
| 2013/0191610 A1* | 7/2013 | Burka | G06F 12/0253 711/206 |

(Continued)

*Primary Examiner* — Than Nguyen
(74) *Attorney, Agent, or Firm* — Cooper Legal Group, LLC

(57) ABSTRACT

Techniques are provided for multi-tier write allocation. A storage system may store data within a multi-tier storage environment comprising a first storage tier (e.g., storage devices maintained by the storage system), a second storage tier (e.g., a remote object store provided by a third party storage provider), and/or other storage tiers. A determination is made that data (e.g., data of a write request received by the storage system) is to be stored within the second storage tier. The data is stored into a staging area of the first storage tier. A second storage tier location identifier, for referencing the data according to a format utilized by the second storage tier, is assigned to the data and provided to a file system hosting the data. The data is then destaged from the staging area into the second storage tier, such as within an object stored within the remote object store.

20 Claims, 7 Drawing Sheets

(56) References Cited

U.S. PATENT DOCUMENTS

| | | | |
|---|---|---|---|
| 2015/0331617 A1* | 11/2015 | Slik | G06F 3/0613 |
| | | | 711/169 |
| 2016/0011816 A1 | 1/2016 | Aizman | |
| 2016/0021020 A1 | 1/2016 | Deguchi et al. | |
| 2016/0314043 A1* | 10/2016 | Slik | G06F 3/064 |
| 2017/0192903 A1 | 7/2017 | Kawamura et al. | |
| 2017/0262346 A1* | 9/2017 | Pradhan | G06F 3/0647 |

* cited by examiner

MULTI-TIER WRITE ALLOCATION

RELATED APPLICATIONS

This application claims priority to and is a continuation of U.S. application Ser. No. 16/679,914, filed on Nov. 11, 2019, titled "MULTI-TIER DESTAGING WRITE ALLOCATION," which claims priority to and is a continuation of U.S. application Ser. No. 15/581,369, filed on Apr. 28, 2017, titled "MULTI-TIER WRITE ALLOCATION", which are incorporated herein

BACKGROUND

Many storage systems may provide clients with access to data stored within a plurality of storage devices. For example, a storage controller may store client data within a set of storage devices that are locally accessible (e.g., locally attached to the storage controller) or remotely accessible (e.g., accessible over a network). A storage aggregate of storage (e.g., a composite aggregate comprising a set of volumes) may be generated from the set of storage devices (e.g., the storage aggregate may be stored across one or more storage devices). The storage aggregate may be exported from a storage file system to a client. The storage aggregate may appear as one or more storage containers to the client, such as a volume or logical unit number (lun). In this way, the storage aggregate abstracts away the details, from the client, of how the storage aggregate is physically stored amongst the set of storage devices.

Some storage systems may store data within a multi-tiered storage environment. For example, the storage controller may store data within a hard disk drive tier and a solid state storage tier. The hard disk drive tier may be used as a capacity tier to store client data and for processing input/output operations. The solid state storage tier may be used as a cache for accelerating the processing of storage operations. Different storage tiers have different characteristics and behaviors, which can affect performance and guarantees provided to clients by a storage system.

In an example, a storage system may utilize a storage tier (e.g., a local storage tier hosted, owned, and/or managed by one or more nodes of a storage environment associated with the storage system) and a remote object store as two of the storage tiers within which the storage system stores data. The storage system may be able to provide high availability, security, data consistency, data protection, and/or other guarantees using the storage tier because the storage system may manage and control the storage tier. However, the storage system may be unable to provide similar guarantees, such as that data is properly stored, managed, is consistent, and is accurate, to clients for the remote object store because the storage system does not manage and control the remote object store (e.g., a third party provider may host and manage the remote object store). For example, new data could be written to a remote third party object store. When reading the new data, old data or no data could be returned by the remote third party object store due to delay. Thus, the storage system may be unable to provide the same level of enterprise guarantees and efficiencies when working with the remote third party object store as backend storage.

DETAILED DESCRIPTION

Figure 1:
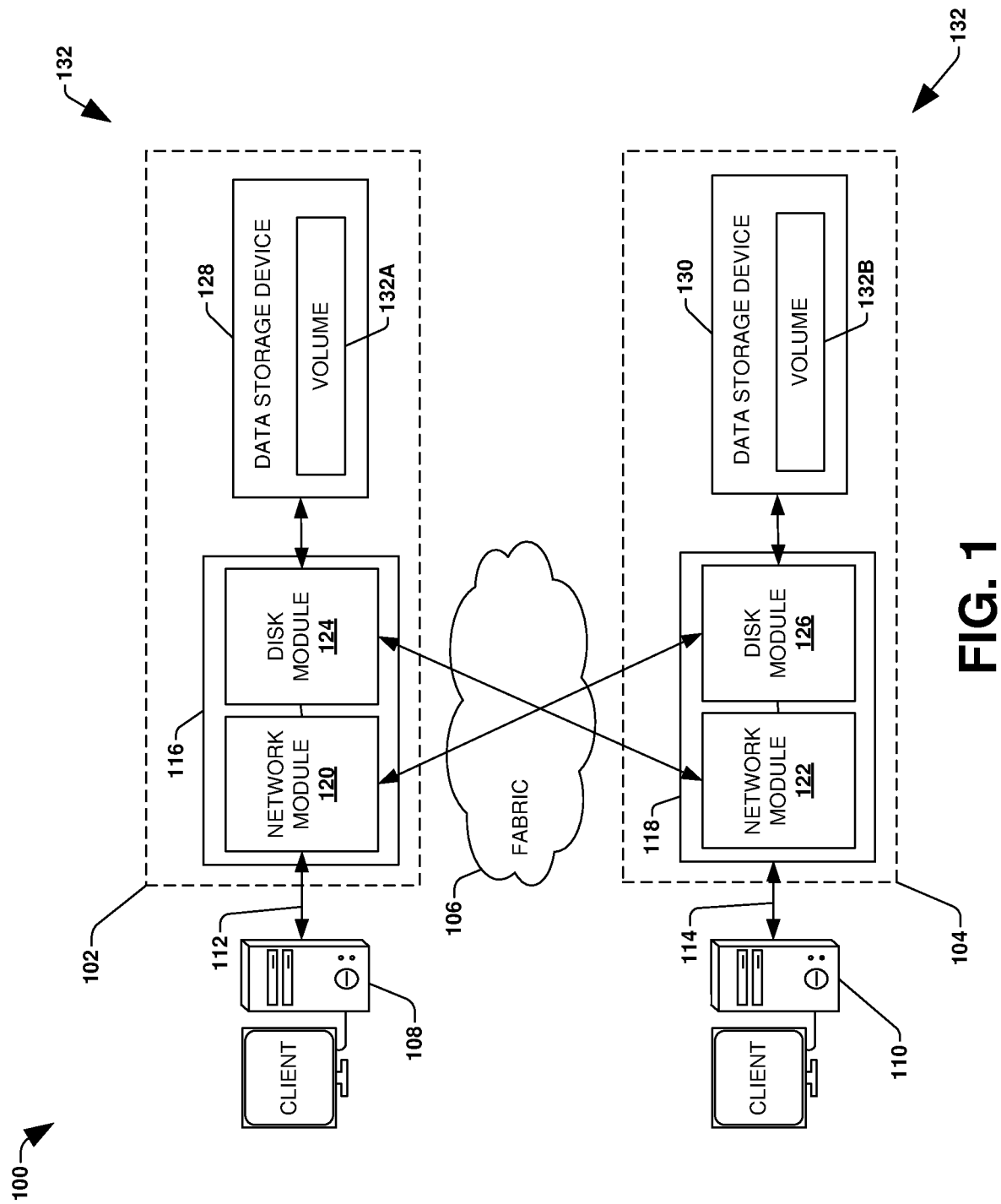
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for multi-tier write allocation are provided herein. A storage system may utilize multiple tiers of storage to store client data. For example, the storage system may utilize a first storage tier (e.g., a performance storage tier, such as a solid state storage tier or a hard disk drive storage tier, locally hosted and/or maintained by nodes of a storage environment associated with the storage system), a second storage tier such as a remote object store (e.g., a distributed network of storage provided by a third party provider, cloud storage, etc.), and/or other tiers of storage.

Because the first storage tier may provide lower latency than the remote object store, more frequently accessed or more recently accessed data (e.g., hot data) may be stored within the first storage tier. Less frequently accessed or less recently accessed data (e.g., cold data) may be migrated from the first storage tier to the second storage tier. Unfortunately, a substantial amount of resources, time, and delay may be introduced when data is stored within the first storage tier for access by a file system using a storage format of the first storage tier (e.g., an addressing or naming scheme), temperatures are tracked for data blocks, and cold data blocks are moved from the first storage tier to the second storage tier for access by the file system using a storage format of the second storage tier. The file system must be updated to utilize the storage format of the second storage tier for each of the cold data blocks now stored within the second storage tier.

Accordingly, as provided herein, data may be identified for storage within the second storage tier based upon an application specifying such, the data being associated with a policy (e.g., a mirroring policy, a snapshot policy, etc.), the data being stored within a particular type of volume such as a backup volume, and/or other indicators (e.g., indicators of data known or expected to be cold). Instead of first storing the data within the first storage tier for access by the file system using the storage format of the first storage tier, the data is stored within a staging area of the first storage tier. A second storage tier location identifier, corresponding to the storage format of the second storage tier, is assigned to the data (e.g., a physical volume block number (pvbn) used by the second storage tier such as a remote object store hosted by a third party storage provider such as a cloud storage provider). The second storage tier location identifier may be provided to the file system. In this way, the data can be destaged to the second storage tier (e.g., stored as an object within the remote object store) in a consistent manner without the need to change how the file system references the data because the file system was already configured to utilize the second storage tier location identifier.

To provide for multi-tier write allocation, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and disk modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device by sending a request through the disk module 126 of node 118.

Disk modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, disk modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and disk modules, other embodiments may comprise a differing number of these modules. For example, there may be a plurality of network and disk modules interconnected in a cluster that does not have a one-to-one correspondence between the network and disk modules. That is, different nodes can have a different number of network and disk modules, and the same node can have a different number of network modules than disk modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. In an example, a disk array can include all traditional hard drives, all flash drives, or a combination of traditional hard drives and flash drives. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the volume 132A, to store and/or retrieve data, using the data storage system 102 connected by the storage network connection 112. Further, in this embodiment, the host device 110 can exchange data with the network module 122 in the node 118 within the data storage system 104 (e.g., which may be remote from the data storage system 102). The node 118 can forward the data to the data storage device 130 using the disk module 126, thereby accessing volume 132B associated with the data storage device 130.

It may be appreciated that multi-tier write allocation may be implemented within the clustered network environment 100. In an example, the node 116 and/or the node 118 may utilize a multi-tier storage environment such as a remote object store and/or the data storage devices 128, 130 for serving client requests. It may be appreciated that multi-tier write allocation may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
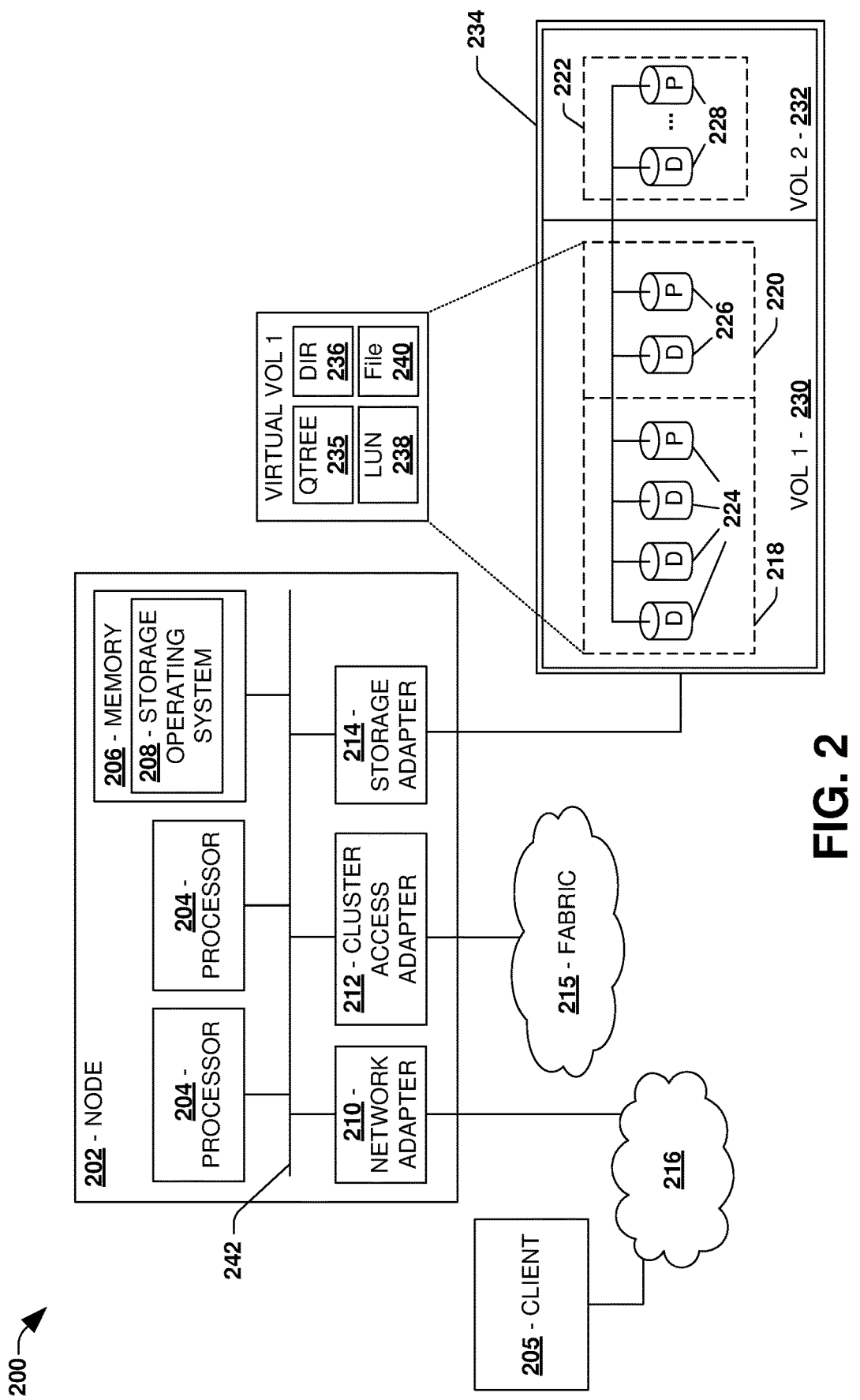
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provide access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software application code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that multi-tier write allocation may be implemented for the data storage system 200. In an example, the node 202 may utilize a multi-tier storage environment such as a remote object store and/or other storage tiers for serving client requests. It may be appreciated that multi-tier write allocation may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
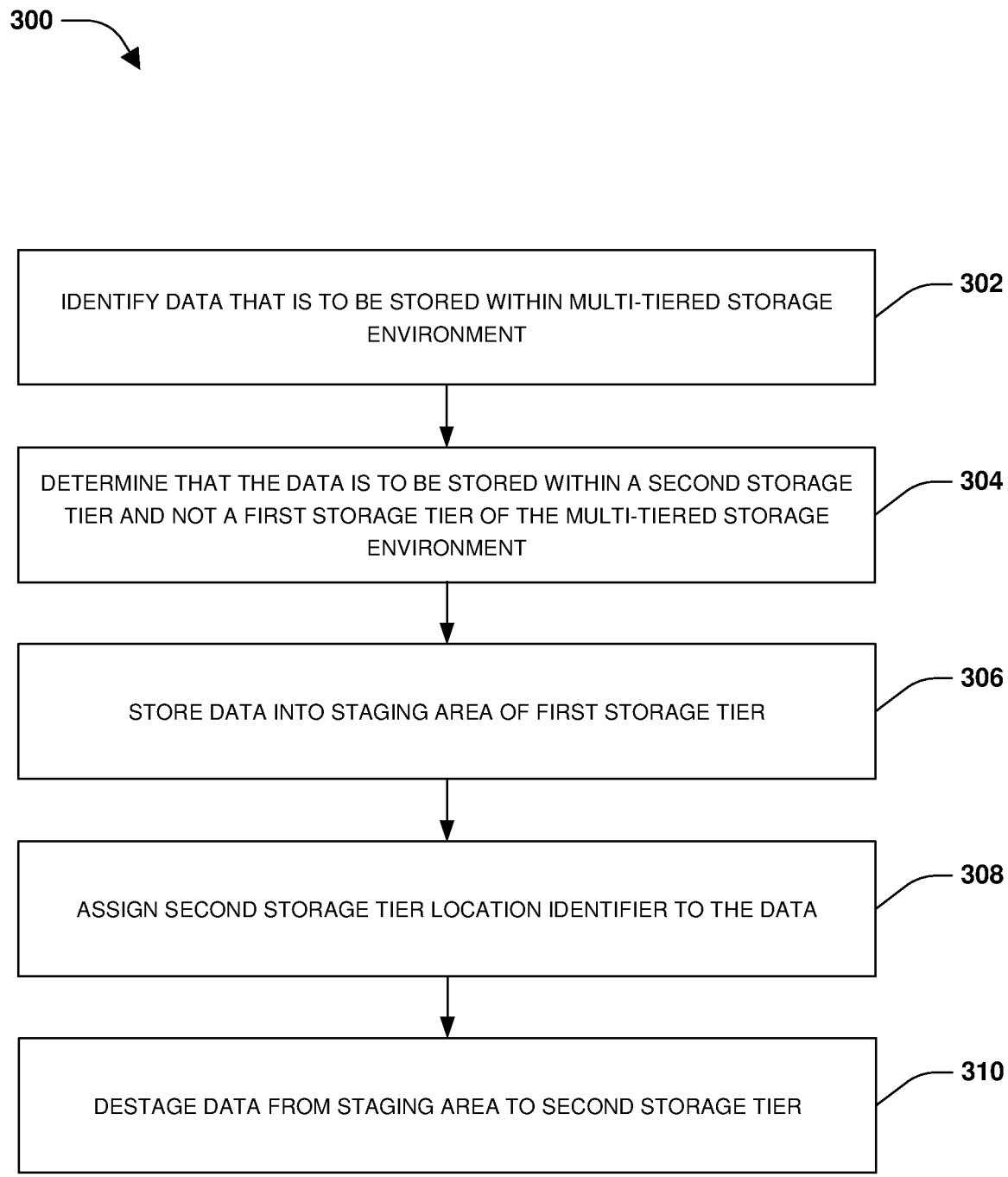
FIG. 3 is a flow chart illustrating an exemplary method of multi-tier write allocation.

One embodiment of multi-tier write allocation is illustrated by an exemplary method 300 of FIG. 3. A storage system may provide clients with access to client data stored within a backend such as a multi-tier storage environment. The backend may be configured with one or more tiers of storage. For example, the backend may be configured with a first storage tier (e.g., solid state drives, hard disk drives, etc.), a second storage tier such as a remote object store (e.g., a third party storage provider, cloud storage, etc.), etc.

The storage system may store data within the first storage tier as a performance tier for frequently or recently accessed data because the first storage tier may have lower latency and more guarantees than the second storage tier such as the remote object store. The storage system may migrate data from the first storage tier to the second storage tier (e.g., less frequently or less recently accessed data) or may store new data to the remote object store. In an example, the first storage tier comprises storage devices hosted by a storage environment of the storage system (e.g., clusters of nodes may store data with storage devices owned and managed by such nodes) that manages client access to volumes whose data is stored across the multi-tier storage environment. The second storage tier comprises a remote object store hosted by a third party storage provider and not the storage environment. The first storage tier may have lower latency and improved consistency guarantees than the second storage tier because the storage environment hosts and manages the first storage tier.

The storage system may create a composite aggregate composed of a set of volumes that are exposed to clients. Data of the set of volumes may be stored within the multi-tier storage environment such as within the first storage tier and as objects within the remote object store of the second storage tier. An object may be assigned a name based upon a volume identifier of a volume (e.g., a buftree UUID uniquely identifying the volume), of the composite aggregate, to which the object belongs. For example, a prefix of the name may be derived from the volume identifier. The name may also be derived from a sequence number uniquely assigned to the object. For example, the prefix of the name may be derived from the sequence number. Monotonically increasing sequence numbers may be assigned to objects that are created within the remote object store for a volume (e.g., sequence numbers may be unique for a particular buftree UUID, but not across buftree UUIDs of other volumes). In an example, the name of the object may be derived from a hash for the volume identifier and/or the sequence number.

The storage system may store objects within the remote object store. An object may comprise a header. The header may comprise a version of the object, an indicator as to whether the object is encrypted, a creation timestamp for the object, a volume identifier (e.g., a buff tree universal identifier such as a buftree UUID), an identifier of a name of the object (e.g., a hash of the name and the buftree UUID, which can be read back after a put operation of the object into the remote object store to verify the hash), and/or other information. In one example, the header is 32 bytes or any other size of information.

The object may comprise one or more object pages corresponding to data chunks, such as data chunks derived from data moved from the first storage tier (e.g., a performance storage tier, such as a solid state storage tier or a disk storage tier) of the storage system to the remote object store. In one example, the object may comprise space for 1024 object pages, such as a first object page, a second object page, and/or other object pages. The first object page may comprise a first data chunk (e.g., 4 kilobytes of data or any other size of data) and a first context associated with the first object page.

The first context may comprise an indicator as to whether the object is encrypted. The first context may comprise an encryption key index used to identify an encryption key. The first context may comprise a pseudobad indicator to indicate whether data read from the local storage tier had an error such as a disk error and the data content in the object is inconsistent. The first context may comprise an indicator as to whether a RAID or storage OS marked the pseudobad error. The first context may comprise an unverified error indicator to indicate that when data read from the local storage tier resulted in an unverified RAID error. The first context may comprise a wrecked indicator that is set when data is forcefully corrupted. The first context may comprise a file block number (e.g., a location of the file block number for the first data chunk within the first volume). The first context may comprise a checksum for the first data chunk and the first context. In an example, the first context may comprise 16 bytes of information or any other size of information.

At 302, data that is to be stored within the multi-tiered storage environment, comprising the first storage tier (e.g., storage devices hosted, owned, and/or managed by nodes and/or clusters of a storage environment that stores client data within the multi-tiered storage environment), the second storage tier (e.g., the remote object store maintained by a third party provider), and/or other storage tiers, may be identified. In one embodiment, the data may be received from an application (e.g., a snapshot creation application, a backup application, etc.) that specifies a property of the data and/or provides an indication into which type of storage tier the data should be stored. For example, the application may specify that the data is cold data (e.g., accessed below a frequency metric), and thus should be stored in the remote object store configured to store cold data.

At 304, a determination is made that the data is to be stored within the second storage tier and not the first storage tier of the multi-tiered storage environment. In one example, the determination is made based upon the application providing an indication that the data is to be stored within the second storage tier, such as an indication that the data is cold (e.g., backup data, infrequently accessed data, data not recently accessed, etc.) and that the second storage tier is to store cold data whereas the first storage tier is to store hot data (e.g., frequently or recently accessed data) because the first storage tier may have less latency than the second storage tier. In an example, the indication may specify that the data is accessed below a frequency metric (cold data).

In another example, the determination is made based upon a property of a volume to which the data belongs. For example, the data may comprise backup data that is being backed up from a source volume to a destination backup volume. The destination backup volume may comprise a backup property specifying that the destination backup volume is being used for backing up data. The second storage tier may be designated for storing backup data of volumes having the backup property.

In another example, the determination is made based upon a determination that the data is associated with a storage policy. For example, the storage policy may comprise a mirroring policy specifying that the data corresponds to mirrored data that is mirrored from a source to a destination. In another example, the storage policy may comprise a backup policy specifying that the data corresponds to backup data that is backed up from the source to the destination. The second storage tier may be designated for storing data associated with the mirroring policy, the backup policy, or other type of storage policy.

At 306, the data is stored (e.g., from within memory of a storage system, such as a storage controller or node that received a write request from a client to write the data into the multi-tier storage environment) into a staging area of the first storage tier. The staging area may be storage space within the first storage tier that is designated for data that is to be stored into the second storage tier. For example, the data is written to a staging file, such as a TLOG file, used to stage blocks that are to be written to the second storage tier. Thus, the data is written into the staging area according to a first storage tier location identifier (e.g., a first physical volume block number (pvbn), a first file block number, a first virtual volume block number (vvbn), or other storage location format used by the first storage tier to store and reference data). A file system hosting the data (e.g., an active file system associated with a volume to which the data is assigned) is not provided with the first storage tier location identifier as a primary reference for identifying the data. Instead, a second storage tier location identifier (e.g., a second physical volume block number (pvbn), a second file block number, a second virtual volume block number (vvbn), or other storage location format used by the second storage tier such as the remote object store to store and reference data) is assigned to the data within the staging area, at 308. The second storage tier location identifier is provided to the file system (e.g., the active file system currently providing clients with access to data of the volume) for referencing the data even though the data is not yet stored to the second storage tier.

In an example, a mapping between the first storage tier location identifier and the second storage tier location identifier may be created. The mapping may be utilized to identify the data within the staging area, such as by the file system. For example, a request may be received to access the data before the data is destaged from the staging area to the second storage tier. The data may be provided from the staging area using the mapping to satisfy the request. For example, the file system may utilize the second storage tier location identifier as a lookup into the mapping to identify the first storage tier location identifier that can be used to access the data within the staging area.

At 310, the data is destaged from the staging area to the second storage tier. In an example where the second storage tier is a remote object store, an object is created within the second storage tier to comprise the data. A name is created for the object based upon a volume identifier of the volume to which the data of the object belongs. The name may also be based upon a sequence number assigned to the object. Sequence numbers may be monotonically assigned to objects of the volume for uniquely identifying objects assigned to that particular volume. For example, the name may correspond to a hash of the volume identifier and the sequence number. The object is then stored into the remote object store. Because the file system has already been configured to reference the data using the second storage tier location identifier used by the second storage tier to store and reference the data, no additional changes need to be made to the file system after the data has been destaged and stored to the second storage tier. Thus, the file system can reference and access the data within the second storage tier using the second storage tier location identifier. In an example, the data can be removed from the staging area based upon a confirmation that the data is stored within the object of the second storage tier.

In one example, a determination is made that the data has a deduplication property indicating that the data has been deduplicated. Accordingly, the deduplication property of the data is maintained while the data is stored within the staging area and/or while the data is stored within an object of the second storage tier. In this way, deduplication may be preserved when data is stored into objects of the second storage tier.

In another example, a determination is made that the data has a compression property indicating that the data has been compressed. Accordingly, the compression property of the data is maintained while the data is stored within the staging area and/or while the data is stored within an object of the second storage tier. In this way, compression may be preserved when data is stored into objects of the second storage tier.

In an example, the storage environment, configured to store client data within the multi-tier storage environment, may comprise one or more clusters of nodes that host and/or manage storage devices of the first storage tier but not the second storage tier. For example, a node may provide clients with primary access to data, while a partner node may be configured to provide failover operation in place of the node in the event the node fails (e.g., data may be replicated from the node to the partner node). An occurrence of a network connection outage may be determined (e.g., a loss of connectivity between the node and the partner node, loss of connectivity from the nodes to the second storage tier, etc.). Accordingly, data received during the network connection outage may be stored into the staging area (e.g., the node may store data into a first staging area accessible to the node during the network connection outage, the partner node may store data into a second staging area accessible to the partner node during the network connection outage, etc.). Monotonically increasing sequence numbers may be assigned to objects that are to store the data within the second storage tier. In this way, the objects may be uniquely identified when stored within the second storage tier notwithstanding the network connection outage.

A determination may be made that connectivity has been restored. Accordingly, objects may be created with object names derived from the sequence numbers for uniquely identify the objects. The objects may be stored, from the staging area (e.g., from the first and second staging areas) to the second storage tier, within the objects.

Figure 4A:
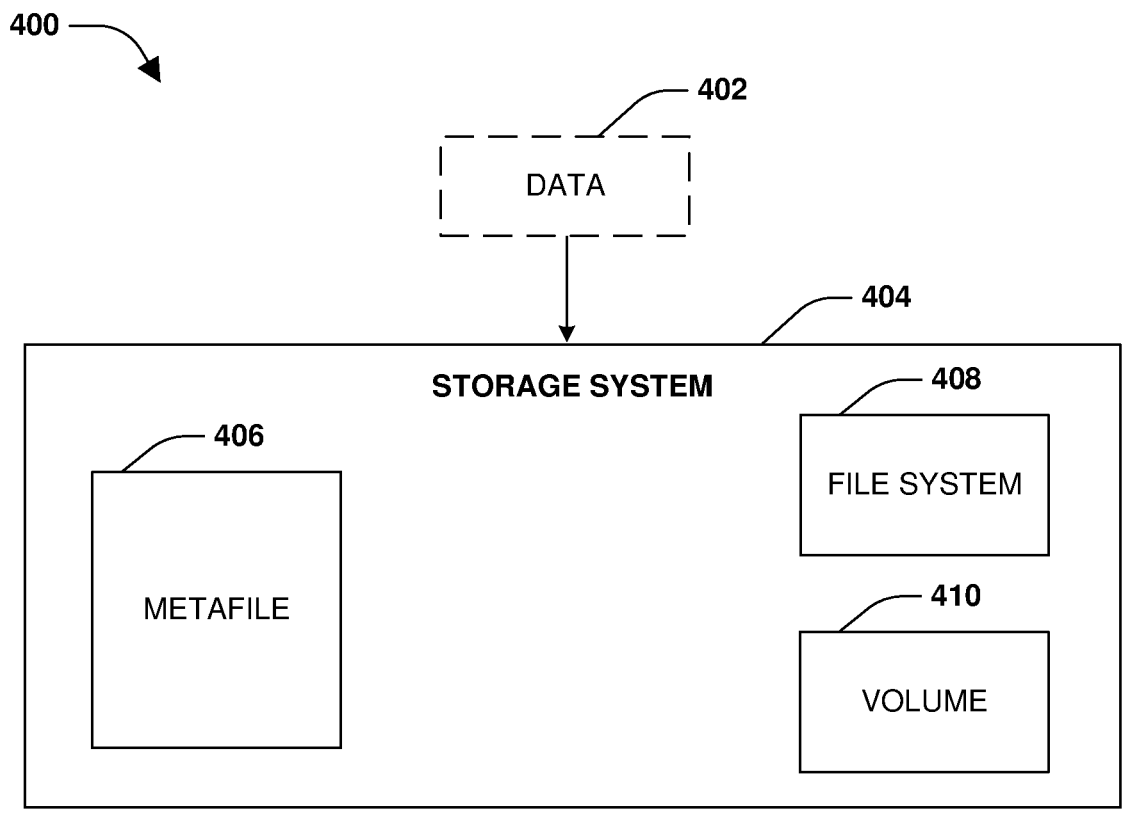
FIG. 4A is a component block diagram illustrating an exemplary computing device for multi-tier write allocation, where data is identified for storage within a multi-tier storage environment.
Figure 4A:
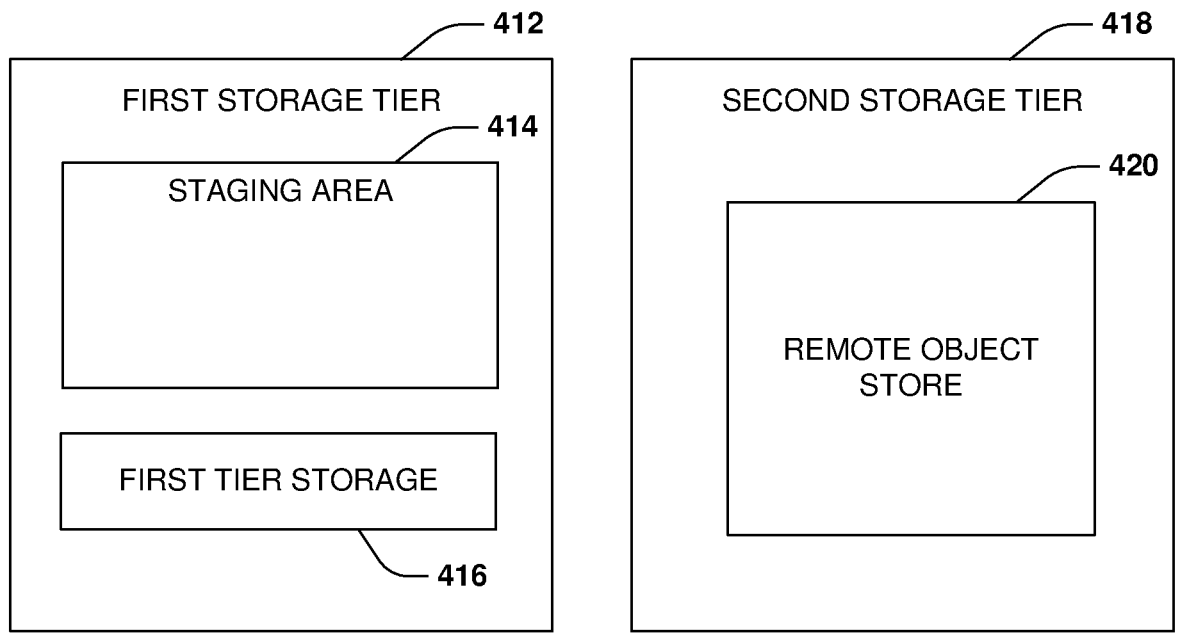
Figure 4B:
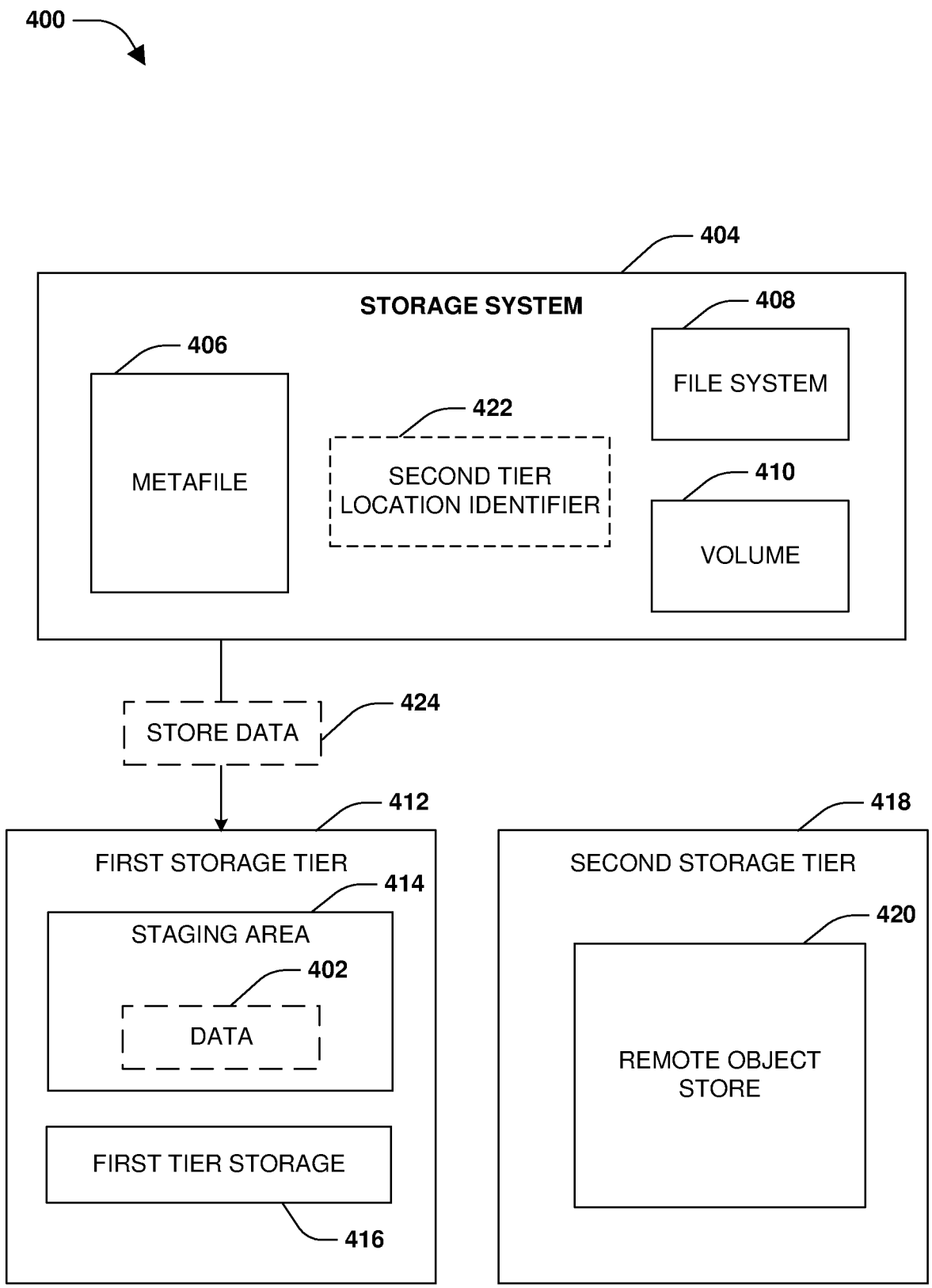
FIG. 4B is a component block diagram illustrating an exemplary computing device for multi-tier write allocation, where data is staged within a first storage tier.
Figure 4C:
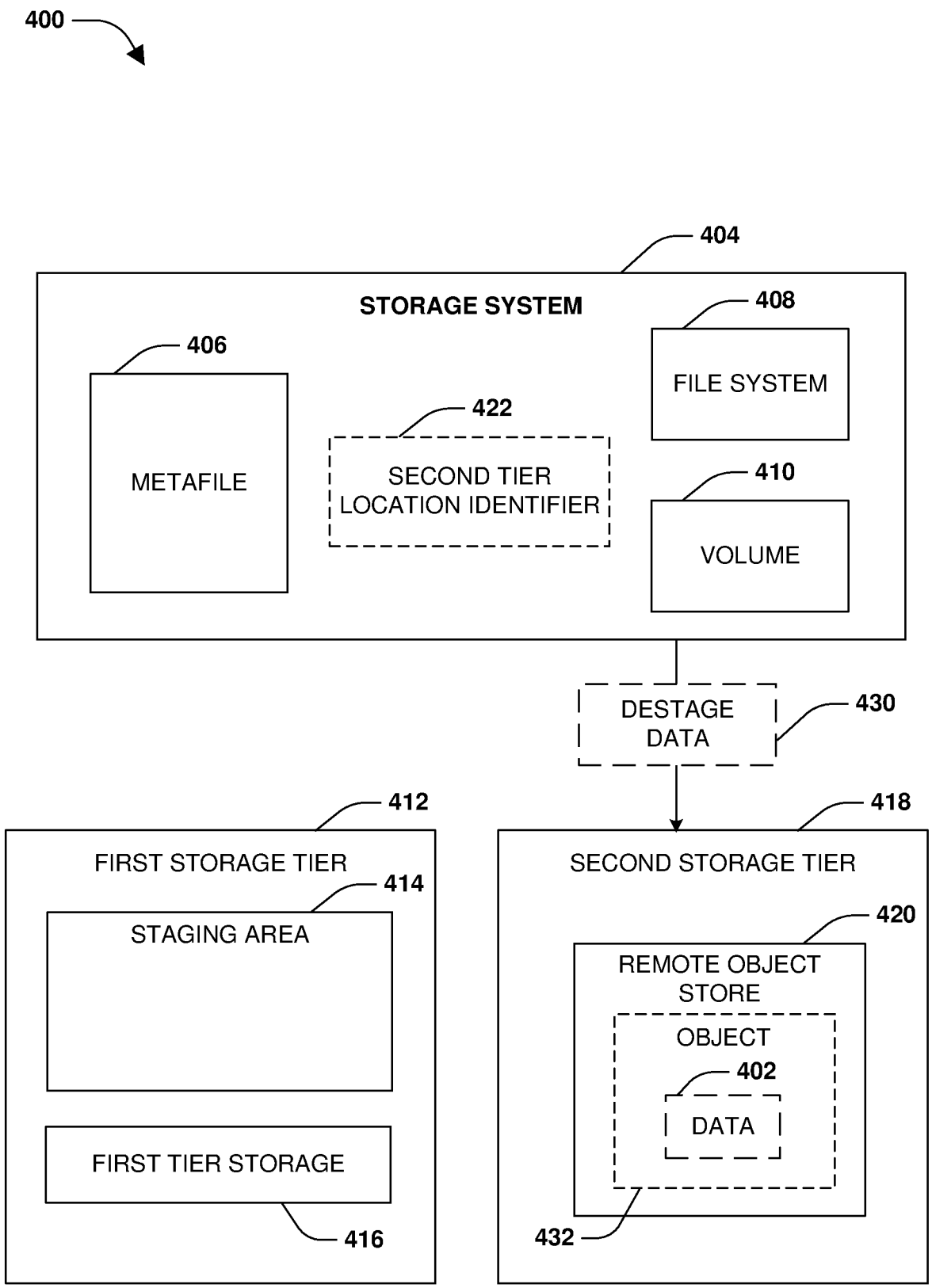
FIG. 4C is a component block diagram illustrating an exemplary computing device for multi-tier write allocation, where data is destaged to a second storage tier.

FIGS. 4A-4C illustrate an example of a system 400 for multi-tier write allocation. FIG. 4A illustrates a storage system 404 that may host and/or manage a first storage tier 412 (e.g., storage locally accessible to one or more nodes of one or more clusters associated with the storage system 404). The storage system 404 may store data within the first storage tier 412, such as storing client data into first tier storage 416. The storage system 404 may also store data within objects of a second storage tier 418 such as a remote object store 420 (e.g., storage provided by a third party storage provider). The first storage tier 412, the second storage tier 418, and/or other storage tiers may be part of a multi-tier storage environment used by the storage system 404 to store data. The storage system 404 may maintain a metafile 406 comprising information related to the objects, such as sequence numbers assigned to objects of a volume. The storage system 404 may maintain a volume 410 that is exposed to clients. A file system 408 may be associated with the volume 410.

The storage system 404 may identify data 402 that is to be stored into the multi-tier storage environment. The storage system 404 may determine that the data 402 should be stored to the second storage tier 418. In an example, the storage system 404 may receive an indication from an application that the data 402 has a property indicating that the data 402 should be stored into the second storage tier 418 (e.g., an infrequent access property indicative of cold data that should be stored into the second storage tier 418 that may have higher latency than the first storage tier 412 that is better suited for storing frequently accessed hot data). Other indicators may be used to determine that the data 402 should be stored into the second storage tier 418, such as the data 402 being associated with a backup volume or mirror destination volume, the data 402 being associated with a backup policy or a mirroring policy, etc.

Accordingly, the storage system 404 may store 424 the data 402 into a staging area 414 of the first storage tier 412 based upon the determination that the data 402 should be stored within the second storage tier 418, as illustrated in FIG. 4B. A second tier location identifier 422 may be assigned to the data 402. For example, the second tier location identifier 422 may be provided to the file system 408 for referencing the data 402 when the data 402 is stored to the second storage tier 418. The second tier location identifier 422 may correspond to a format used by the second storage tier 418 for referencing the location of data, such as data blocks, stored by the second storage tier 418.

FIG. 4C illustrates the storage system 404 destaging 430 the data 402 from the staging area 414 into the second storage tier 418. The data 402 may be stored into an object 432 that is stored within the remote object store 420 of the second storage tier 418. Because the file system 408 is already configured to reference the data 402 using the second tier location identifier 422, the file system 408 does not need to be updated to maintain consistency. In an example, the data 402 is deleted from the staging area 414.

Figure 5:
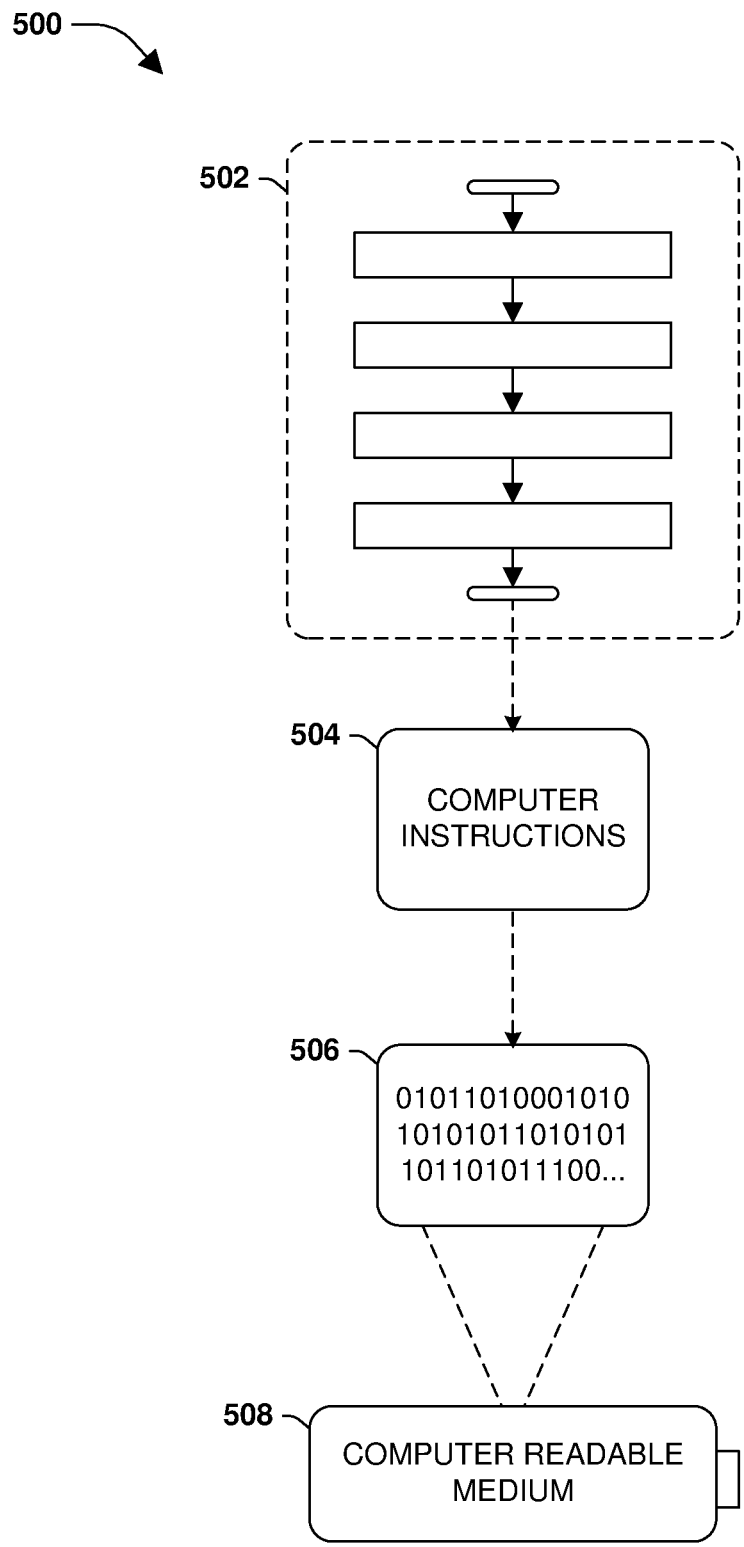
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a compact disc-recordable (CD-R), a digital versatile disc-recordable (DVD-R), flash drive, a platter of a hard disk drive, etc., on which is encoded computer-readable data 506. This computer-readable data 506, such as binary data comprising at least one of a zero or a one, in turn comprises a processor-executable computer instructions 504 configured to operate according to one or more of the principles set forth herein. In some embodiments, the processor-executable computer instructions 504 are configured to perform a method 502, such as at least some of the exemplary method 300 of FIG. 3, for example. In some embodiments, the processor-executable computer instructions 504 are configured to implement a system, such as at least some of the exemplary system 400 of FIGS. 4A-4C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device comprising:
   a memory comprising machine executable code; and
   a processor coupled to the memory, the processor configured to execute the machine executable code to cause the computing device to:
   determine that incoming data, received by a node but not yet stored within a local storage tier hosted by the node, is to be stored within a cloud computing environment remote to the local storage tier without storing the incoming data into a storage device of the local storage tier based upon a property of the incoming data;
   selectively store the incoming data within a staging area designated for data to be tiered out to the cloud computing environment;
   create an object comprised of the incoming data in the staging area, wherein a name is assigned to the object based upon at least one of a sequence number generated for the object and an identifier of a volume to which the incoming data is to be associated; and
   transmit the object from the staging area to the cloud computing environment, wherein the object is identified and accessed from the cloud computing environment using the name.

2. The computing device of claim 1, wherein machine executable code causes the computing device to:
   evaluate the incoming data to determine that the property of the incoming data corresponds to a type of data being stored within the volume; and
   in response to the type of data being designated for being stored within the cloud computing environment and not the local storage tier, selectively store the incoming data within the staging area for tiering out to the cloud computing environment as the object.

3. The computing device of claim 1, wherein machine executable code causes the computing device to:
   evaluate first incoming data to determine that a first property of the first incoming data corresponds to a type of data being stored within the volume; and
   in response to the type of data being designated for being stored within the local storage tier and not the cloud computing environment, refrain from storing the first incoming data within the staging area, and store the first incoming data within the storage device of the local storage tier.

4. The computing device of claim 1, wherein machine executable code causes the computing device to:
   reference data within the local storage tier using first storage tier location identifiers and data within the cloud computing environment using second storage tier location identifiers; and
   utilize a mapping between the first storage tier location identifiers and the second storage tier location identifiers to provide access to data within the staging area before the data is tiered to the cloud computing environment.

5. The computing device of claim 1, wherein machine executable code causes the computing device to:
   store the incoming data within the staging area according to a first storage tier location identifier used by the local storage tier to reference data, wherein the first storage tier location identifier is derived from a physical volume block number associated with the volume; and
   provide a client with access to the incoming data within the staging area using the first storage tier location identifier.

6. The computing device of claim 1, wherein machine executable code causes the computing device to:
   assign a first storage tier location identifier to the incoming data while the incoming data is stored within the staging area, wherein the first storage tier location identifier is used by the local storage tier to reference data, and wherein the first storage tier location identifier is derived from a virtual volume block number associated with the volume; and
   provide a client with access to the incoming data within the staging area using the first storage tier location identifier.

7. The computing device of claim 1, wherein machine executable code causes the computing device to:
   generate a first storage tier location identifier based upon a file block number associated with the volume, wherein the first storage tier location identifier is assigned to the incoming data while the incoming data is stored within the staging area; and provide a client with access to the incoming data within the staging area using the first storage tier location identifier.

8. The computing device of claim 1, wherein machine executable code causes the computing device to:

in response to receiving a request to access the incoming data before the incoming data is destaged from the staging area, perform a lookup into a mapping using a second storage tier location identifier to identify a first storage tier location identifier for accessing the incoming data within the staging area, wherein the mapping maps first storage tier location identifiers used by the local storage tier to second storage tier location identifiers used by the cloud computing environment.

9. The computing device of claim 1, wherein machine executable code causes the computing device to:

determine that deduplicated data stored within the local storage tier is to be tiered out to the cloud computing environment;

store the deduplicated data within the staging area;

create a first object to comprise the deduplicated data, wherein the deduplicated data remains in a deduplicated state while stored in the first object; and tier the first object to the cloud computing environment.

10. The computing device of claim 1, wherein machine executable code causes the computing device to:

determine that compressed data stored within the local storage tier is to be tiered out to the cloud computing environment;

store the compressed data within the staging area;

create a first object to comprise the compressed data, wherein the compressed data remains in a compressed state while stored in the first object; and tier the first object to the cloud computing environment.

11. The computing device of claim 1, wherein machine executable code causes the computing device to:

create a storage policy to specify that a first type of data is to be stored within the local storage tier and that a second type of data is to be stored within the cloud computing environment; and utilize the storage policy to selectively store data within the local storage tier and the cloud computing environment.

12. The computing device of claim 1, wherein machine executable code causes the computing device to:

create a second storage tier location identifier to use for referencing the incoming data while stored within the staging area, wherein the second storage tier location identifier is used by the cloud computing environment to reference data; and provide the second storage tier location identifier to a file system for accessing the incoming data while stored within the staging area.

13. The computing device of claim 1, wherein machine executable code causes the computing device to:

identify properties of volumes into which data is to be stored; and selectively store the data within the local storage tier or the cloud computing environment based upon the properties.

14. A method comprising:

utilizing a storage policy to determine whether incoming data, received by a node but not yet stored within a local storage tier hosted by the node, is to be stored within a cloud computing environment remote to the local storage tier without storing the incoming data into a storage device of the local storage tier based upon a property of the incoming data;

selectively storing the incoming data within a staging area designated for data to be tiered out to the cloud computing environment;

creating an object comprised of the incoming data in the staging area, wherein a storage tier location identifier is assigned to the incoming data within the staging area for accessing the incoming data while stored within the staging area; and transmitting the object from the staging area to the cloud computing environment.

15. The method of claim 14, comprising:

generating the storage tier location identifier based upon at least one of a file block number, a physical volume block number, or a virtual volume block identifier associated with the volume; and providing a client with access to the incoming data within the staging area using the storage tier location identifier.

16. The method of claim 14, comprising:

storing deduplicated data within the staging area, wherein the deduplicated data was deduplicated while stored within the local storage tier;

creating a first object to comprise the deduplicated data, wherein the deduplicated data remains in a deduplicated state while stored in the first object; and tiering the first object to the cloud computing environment.

17. The method of claim 14, comprising:

storing compressed data within the staging area, wherein the compressed data was compressed while stored within the local storage tier;

creating a first object to comprise the compressed data, wherein the compressed data remains in a compressed state while stored in the first object; and tiering the first object to the cloud computing environment.

18. The method of claim 14, comprising:

in response to receiving a request to access the incoming data before the incoming data is destaged from the staging area, performing a lookup into a mapping using the storage tier location identifier to identify a different storage tier location identifier for accessing the incoming data within the staging area, wherein the mapping maps the storage tier location identifier to the different storage tier location identifier.

19. A non-transitory machine readable medium comprising instructions for performing a method, which when executed by a machine, causes the machine to:

utilize a storage policy to determine whether incoming data, received by a node but not yet stored within a local storage tier hosted by the node, is to be stored within a cloud computing environment remote to the local storage tier without storing the incoming data into a storage device of the local storage tier based upon a property of the incoming data;

selectively store the incoming data within a staging area designated for data to be tiered out to the cloud computing environment;

create an object comprised of the incoming data in the staging area, wherein a storage tier location identifier is assigned to the incoming data within the staging area for accessing the incoming data while stored within the staging area; and transmit the object from the staging area to the cloud computing environment.

20. The non-transitory machine readable medium of claim 19, wherein the storage policy specifies that data accessed below a frequency metric is to be tiered to the cloud computing environment and that data accessed above the frequency metric is to be stored within the local storage tier.

\* \* \* \* \*